United States Patent [19]

Föhl

[11] 4,050,644
[45] Sept. 27, 1977

[54] INERTIA RESPONSIVE CONTROL DEVICE

[76] Inventor: Artur Föhl, Schelmenwasenstr. 68, 7061 Haubersbronn, Germany

[21] Appl. No.: 542,381

[22] Filed: Jan. 20, 1975

[30] Foreign Application Priority Data

Jan. 22, 1974 Germany .......................... 2402921

[51] Int. Cl.$^2$ ..................... A62B 35/02; B65H 75/48
[52] U.S. Cl. ..................... 242/107.4 A; 188/139; 200/61.52; 200/61.58 B
[58] Field of Search ............... 242/107.4 R, 107.4 A; 200/52 A, 61.45 R, 61.45 M, 61.52, 61.58 B; 280/744–747; 180/82 C; 188/135–139

[56] References Cited

U.S. PATENT DOCUMENTS

| 2,127,753 | 8/1938 | Radtke | 200/61.52 |
| 3,343,763 | 9/1967 | Spouge | 242/107.4 A |
| 3,430,891 | 3/1969 | Burleigh | 242/107.4 A |
| 3,722,824 | 3/1973 | Hayashi | 242/107.4 A |
| 3,770,224 | 11/1973 | Hayashi et al. | 242/107.4 A |
| 3,857,528 | 12/1974 | Fiala | 242/107.4 R |
| 3,873,042 | 3/1975 | Weman | 242/107.4 A |
| 3,917,188 | 11/1975 | Nilsson | 242/107.4 A |
| 3,926,384 | 12/1975 | Weman | 242/107.4 A |

Primary Examiner—Stanley N. Gilreath
Assistant Examiner—John M. Jillions
Attorney, Agent, or Firm—Walter Becker

[57] ABSTRACT

An inertia responsive control device in which a ball is provided which is supported by a recess therebeneath which is smaller in the lateral direction than the ball. A control element is pivotally supported at a point spaced from the ball and extends over and rests on top of the ball, preferably by way of a downwardly concave region. Movement of the ball laterally of the recess is limited so the center of gravity of the ball remains within the limits of the recess. Upward tilting of the control element by movement of the ball laterally of the recess is employed to initiate a control function, such as the locking of a safety belt.

19 Claims, 10 Drawing Figures

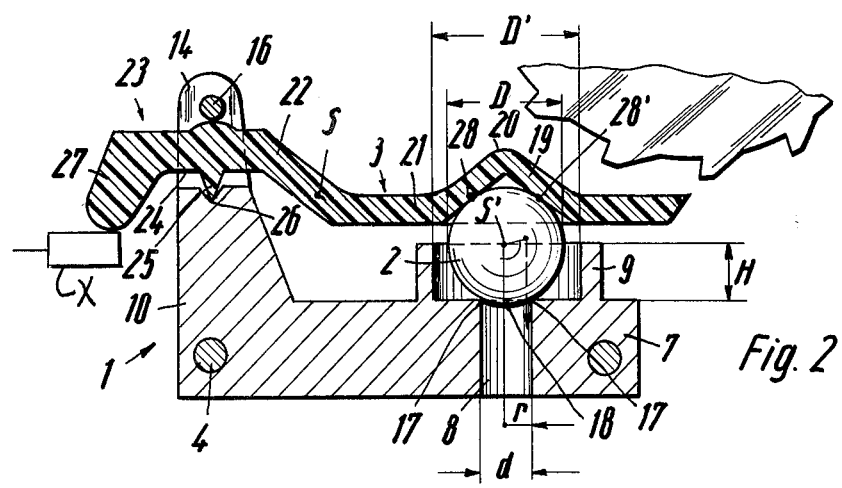
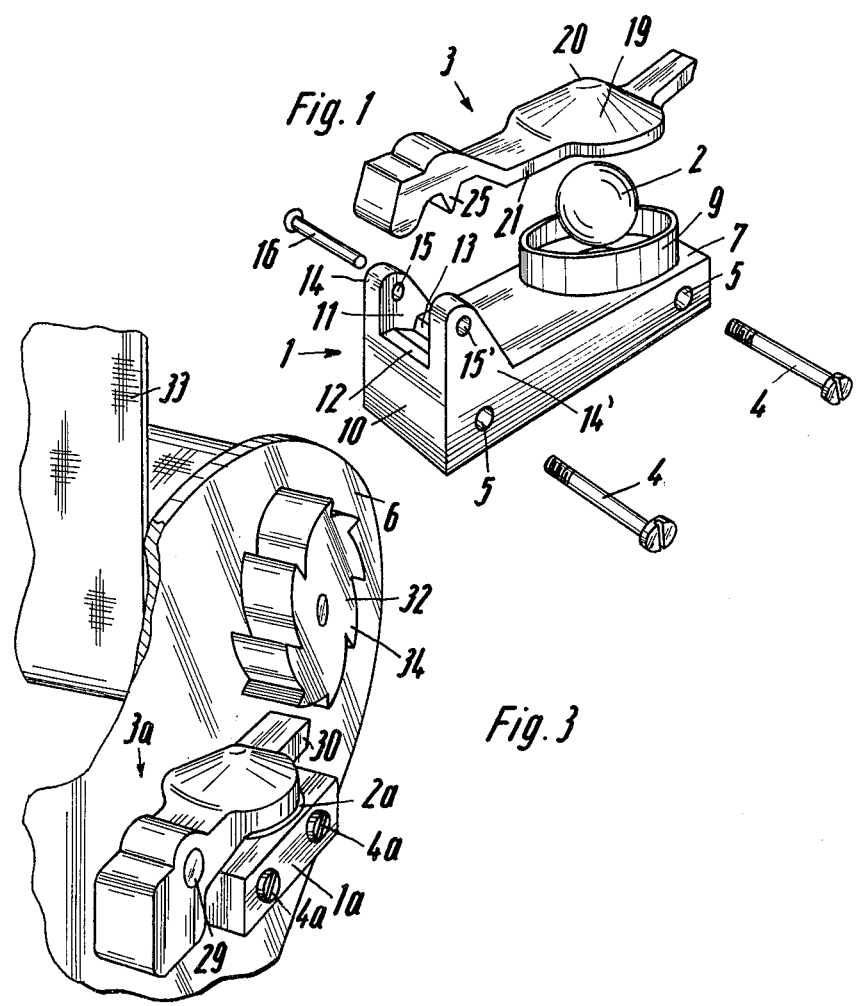

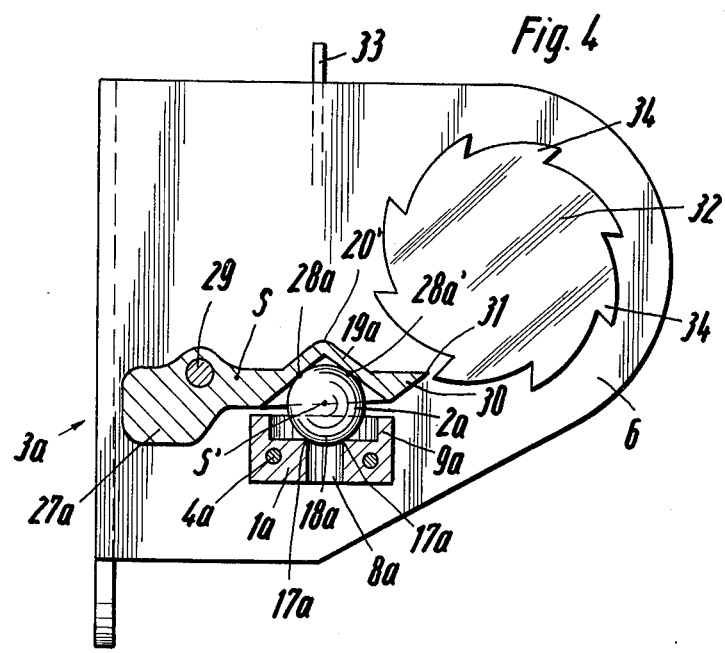
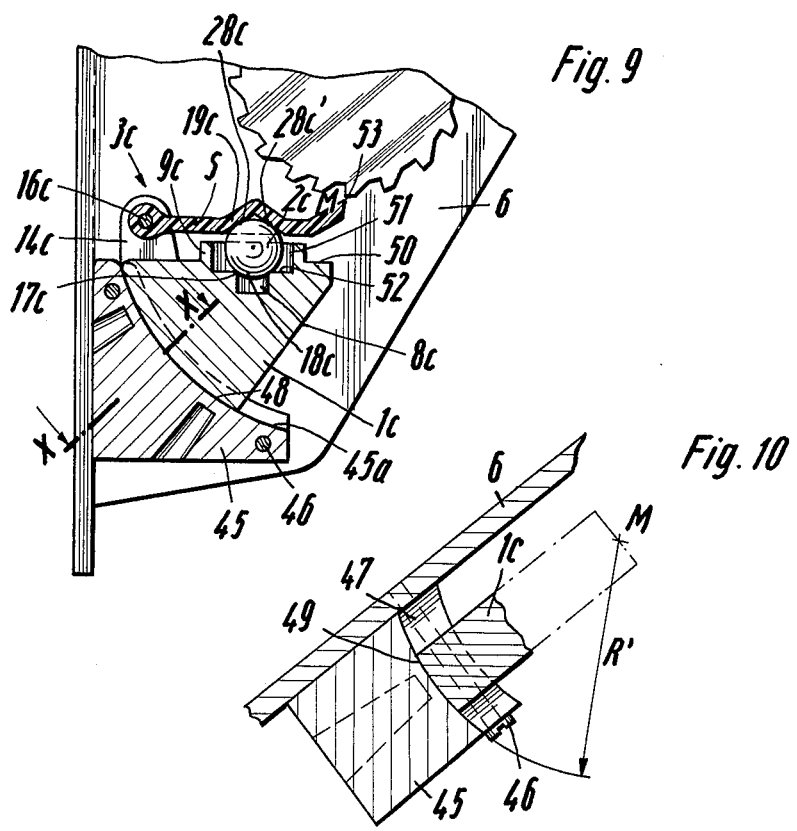

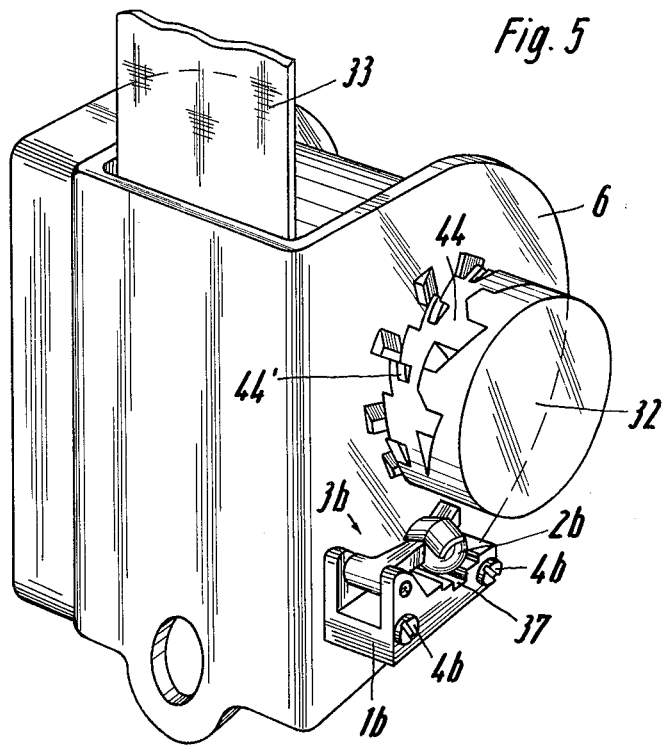
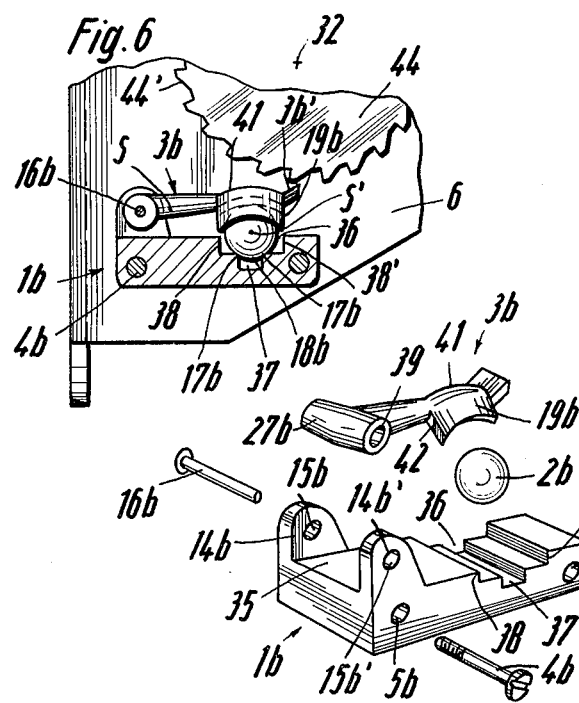
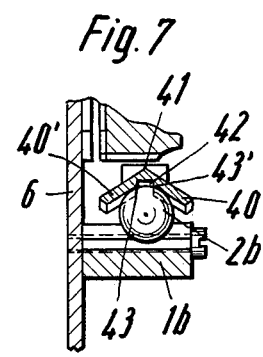

INERTIA RESPONSIVE CONTROL DEVICE

The invention relates to control devices for installation in vehicles which are independent of acceleration and deceleration and comprise a ball which acts as an element of mass inertia, is moveable from its static neutral position in various directions, and is associated with at least one control element.

Control devices of this kind are, for example, used in order to initiate the locking of the spool shaft of automatic wind-up systems for safety belts. A known device of this type incorporates a ball located in the center of a conical supporting dish when in its neutral position, with a lever-type control element resting on the ball. The free end of this lever, whose other end is fixed to the wall of the control device, carries a locking member which is associated with a control disc on the spool shaft of the safety belt. When a given limiting value of deceleration or acceleration is exceeded the ball, as a result of its inertia, rolls out of its central position on the dish, rises up on the conical wall surfaces and lifts up the control lever. The locking member at the free end of the control lever is correspondingly swivelled upwards and engages with the control disc, engaging the latter during its rotation until it reaches a stopping member. Both the locking member and the control disc are thereby prevented from further rotation, and this automatically locks the spool shaft of the safety belt.

The safety regulations for control devices of the above type demand progressively smaller minimum operating values for the initiation of the locking of the spool shaft. The control units must therefore be sensitive enough to react to extremely small values of acceleration or deceleration. With the known device described above most of the force of acceleration acting in the horizontal plane is converted into a lifting motion and consequently only a fraction of this force is available for the actual work of controlling. The response sensitivity is correspondingly reduced. Assuming, for example that an inertia ball made of steel and having a diameter of 10 mm. is exposed to an acceleration or deceleration of 0.5 g; this means that the force of mass is about 2 p. Under an acceleration of not more than some 0.3 g, this force is approximately 1.2 p, which is almost half of the previous value. This example confirms that the control devices must be very accurate and sensitive to respond to very small minimum operating values.

It is therefore an aim of the invention to provide a control device which is simple in its design and inexpensive to manufacture, has a high response sensitivity and provides a high degree of reliability, locking the spool shaft swiftly and dependably. In addition to this, the accuracy of control is required to be approximately constant both on up-gradients and down-gradients and on horizontal sections of the road, the device being developed mainly for installation in motorised road vehicles.

According to the invention these requirements have been met by causing the ball to rest, in its neutral position, against the boundary edges of a cut-out which extend, at least roughly, in a horizontal plane, the cut-out radius being determined by the depth to which the ball engages and being smaller than the ball radius, and the maximum path covered by the ball during the control movement being such that the center of gravity of the ball always remains inside the boundary edges.

When the permissible values of acceleration or deceleration are exceeded, the ball is caused by inertia to roll or slip out of its neutral position. The path the ball has to cover when riding up is very small since it is determined by the shallow depth of engagement with the cut-out. The ball then moves towards a horizontal plane which means that its response sensitivity is high enough to satisfy the increased demands of safety regulations. Since the magnitude of the maximum path covered by the ball during the control motion ensures that the center of gravity of the ball remains within the boundaries of the cut-out edges, it is also ensured that the ball automatically rolls back into its neutral position when the control process is completed.

In order to ensure that the control motion is effectively transmitted, the control element which rests on the ball includes a conical portion which widens downwards. The control sensitivity of the control element may be further enhanced by using a material with a specific weight between 0.9 and 2.7 g/m$^3$, (for example a plastics material) for the manufacture of the control element.

In another embodiment according to the invention the ball is supported in a channel which preferably extends in the longitudinal direction of the vehicle and opens upwardly, the control element which rests on the ball comprising a groove which extends transversely to the longitudinal direction of the vehicle, and opens downwardly. The minimum response value in the direction of travel is thereby considerably smaller than that in the perpendicular direction. This fact is very important with a view to the numerous accidents caused by motor vehicles which collide with a parked vehicle or with a vehicle which stops unexpectedly.

So as to make control devices according to the invention suitable for installation in motor vehicles of varying design or manufacture, the complete control equipment consisting of a supporting piece, a ball, and an indexing element, is preferably adjustably mounted on a spherical cap bearing which is fixed to the casing.

The invention is described below in greater detail, with reference to the accompanying drawings which illustrate a number of embodiments by way of example only. In the drawings:

FIG. 1 is an exploded view of a control device according to the invention;

FIG. 2 is a longitudinal section through the control device according to FIG. 1;

FIG. 3 shows a second embodiment of control device according to the invention;

FIG. 4 is a longitudinal section through the control device according to FIG. 3;

FIG. 5 shows a third embodiment of control device according to the invention;

FIG. 6 is a longitudinal section through the control device according to FIG. 5;

FIG. 7 is a section through a supporting system for the ball used with control devices according to the invention;

FIG. 8 is an exploded view of the control device shown in FIG. 5;

FIG. 9 is a longitudinal section through a control device mounted on a spherical support; and FIG. 10 is a section along line X—X in FIG. 9.

FIGS. 1 and 2 show a control device which comprises a supporting piece 1, a ball 2 which has the function of a body of mass inertia, and a control lever 3. The supporting piece 1 preferably consists of one integral piece and has holes 5 in its lower section through which it is connected with the side wall of a casing in which the control device is housed using bolts 4. The supporting piece 1 has a flat section 7 including a circular opening 8 which is surrounded, at a suitable spacing, by an outer boundary wall 9 which is concentric with the center of the opening 8. The outer diameter of this circular wall 9 is slightly smaller than the width of the flat section 7 of the supporting piece 1. This flat portion 7 extends into a raised section 10 at the end of the supporting piece 1, which is provided with a cut-out 11 at its upper end which is open towards the top. A prismatic groove 13 extends along the bottom 12 of the cut-out 11 between two side walls 14, 14' each of which includes holes 15, 15' aligned with each other to receive a pin 16.

The opening 8 whose radius 'r' is smaller than the radius of the ball 2, receives the ball in such a manner that only a section 18 of the ball extends into the opening, with the ball resting on a horizontal plane formed by the circumferential edge zone 17 of the opening. The center of gravity S' of the ball 2 thereby lies above the center of the opening 8. The height H of the circular wall 9 is half as great as the diameter D of the ball 2, and the inner diameter D' of the wall 9 is slightly smaller than the sum of the ball diameter D plus the diameter 'd' of the opening 8.

A conical portion 19 is provided at a distance from one of the ends of the single-arm lever 3. The portion 19 opens downwardly and in the assembled position the tip 20 of the portion 19 is located above the section 21 of the control lever 3.

The larger diameter of the conical portion 19 exceeds the width of the section 21 of the control lever, which is adjacent to an inclined section 22 that leads to an upper section 23 of the control lever. A ridge 25 extending from the underside 24 of the upper section 23 and terminating in a knife edge 26, extends across the entire width of section 23. The free end of the upper section 23 of the control lever ends in a heavier portion 27 which extends downwardly.

This control lever 3 is inserted into the supporting piece with the knife edge 26 resting in the prismatic cut-out 13, the pin 16 preventing it from dropping out. The width of the upper section 23 and consequently also that of the knife edge 26 are at least slightly smaller than the length of the cut-out 11 in the raised section 10 of the supporting piece 1, so as to ensure that there is no friction between the side walls 14, 14' of the cut-out 11 and the control lever 3. The conical portion 19 of the control lever 3 rests against the ball 2 at two points 28, 28' of its conical surface. The center of gravity S of the control lever 3 is thereby located between the knife edge 26 and the ball contact positions 28, 28', preferably nearer to the edge 26 as viewed in the vertical plane. In this way the control lever 3 is in safe contact with the ball 2 despite a very small contact weight. The knife edge, the center of gravity S, and the ball contact points 28, 28' are located in a plane which is advantageously parallel to the edge zone 17, so that forces which are effective at the control lever 3 cannot falsify the minimum operating value.

When the limiting values of acceleration or deceleration are exceeded, the ball 2 is forced by inertia to leave its neutral position. With this arrangement, the workable control range is equally sensitive in all directions lying in the plane of the supporting piece 1. Since only the segment 18 of the ball 2 extends into the opening 8, the lifting work is limited to the effort required to cause the ball to ride up to the edge of the opening 8 and reach the plane upper surface of the flat section 7 of the supporting piece 1. The response sensitivity is therefore very high. During the control action, the lever 3 is swivelled upwards around the edge 26, the movement corresponding to the inclination of the conical surface of portion 19. It is due to the favorable location of the center of gravity S and the frictionless support of the knife edge on the control lever that the control is very exact, the pressure applied on the ball 2 being small, namely only a fraction of a pond. The material of which the control lever 3 is made should have a specific weight between 0.9 and 2.7 g/cm$^3$ and could be, for example, a plastics material. The control sensitivity is thereby further improved.

The control lever 3, when swivelled upwards, interacts with a coupling disc, initiating locking of the spool shaft in a known manner. On completion of the control process the ball 2 returns automatically to its neutral position. This is possible because the maximum distance covered by the ball 2 during the control process is limited by the distance of the limiting wall 9 from the opening 8 and is always within the boundary of the edge 17 of the opening 8. When the ball 2 returns into its starting position, the control lever 3 swivels downwards, thus releasing the spool shaft.

In order to reduce the effective weight of the control lever 3, the lever arm can be designated as an accurately dimensioned counter balance which counteracts the weight of the lever portion 21 which is supported on the ball 2.

With the arrangement described above the ball 2 is capable of initiating locking of the spool shaft in automatic wind-up mechanisms for safety belts, either by a direct action or, as described above, indirectly.

FIGS. 3 and 4 show an embodiment of control device for direct action. Again, the device consists of a bearing piece 1a, a ball 2a, and a control lever 3a which is the control or locking element. The bearing piece 1a, which is fixed by means of bolts 4a to the side wall 6 of the casing in which the device is housed, is separate from the control lever 3a and comprises a circular opening 8a which is located approximately in the center of the bearing piece 1a. A limiting wall 9a surrounds the circular opening 8a at a suitable spacing. As above, the inner diameter of the circular wall 9 is slightly smaller than the sum of the ball diameter plus the diameter of the opening 8a. p The ball 2a is placed on the opening 8a whose radius 'r' is smaller than the ball radius, so that the ball 2a lies on the edge zone 17a, and only its section 18a extends into the opening 8a. The center of gravity S' of the ball 2a lies above the center of the opening 8. The control lever 3a is pivoted around a bearing bolt 29 which is located higher than, and in front of, the bearing piece 1a. In the zone of the ball 2a, the control lever 3a comprises a conical section 19a which widens downwards, its lowest diameter exceeding the width of the control lever 3a. With a view to arranging the center of gravity S of the control lever 3a in the vicinity of the cap bolt 29, the lever 3a has a heavier cross section at its end portion 27a. This enables the pressure of the control lever 3a on the ball 2 to be reduced so as to further increase the control sensitivity. The control lever 3a rests on the ball 2a at points 28a, 28a' on the conical surface of the part 19a.

The conical portion 19a is adjacent to the end section 30a of lever 3a, which constitutes the locking element of the lever, its tip 31 extending upwards into the immediate vicinity of the free end of the spool shaft 32 of the safety belt 33. This free end of the spool shaft 32 carries radial ratchets 34 which can interact with the locking element 30.

When the limiting values of acceleration or deceleration are exceeded, the ball 2a leaves its neutral position, mounting up a very small distance to reach the edge zone 17a. The maximum control distance, determined by the limiting wall 9a is great enough to insure that the center of gravity S' of the ball 2a remains within the boundaries of the edge zone 17a whatever the position of the ball. The control lever 3a is thereby swivelled upwards so that it engages with the ratchets 34, thereby locking the spool shaft 32. In order to avoid additional moments which could affect the control lever 3a during acceleration or deceleration with the ball in its neutral position, the center of gravity S of the control lever 3a is again located in the same plane as the bolt 29 and the ball contact points 28a, 28a', this plane extending parallel to the plane of the limiting edges 17a. When the tension of the belt 33 slackens, the ball 2a returns automatically to its neutral position, because its center of gravity S' lies within the boundaries of the edges 17a.

FIGS. 5 to 8 show a further embodiment of control device, wherein, by way of example, the minimum response value is shown to be considerably smaller in the direction of travel as compared with any other direction. This means that the sensitivity of the control system is higher in the direction of travel than in any other direction. The upper, plane, surface 35 of the integral bearing piece 1b which is fixed to the casing side wall 6 by means of bolts 4b fitting into holes 5b, incorporates a channel 36 which extends across the entire width of the bearing piece 1b, and whose bottom has the shape of a groove 37. The width of this groove 37 is smaller than the diameter D of the ball 2b. One end of the supporting or bearing piece 1b extends into two side walls or lugs 14b, 14b' which project over the upper surface 35 and incorporate two corresponding holes 15b, 15b' which are in alignment and receive a pin 16b. In its neutral position the ball 2b rests on the edges 17b, 17b' of the channel groove 37, which lie in a horizontal plane and allow the ball 2b to extend into the groove 37 to the depth of a segment 18b of the ball only. In the assembled state, the channel 36 and with it the groove 37 extend in the longitudinal direction, that is to say, in the direction of travel. The edge zones 17b, 17b' stabilize the ball 2b which they support in a direction transverse to the direction of travel, thereby constituting the response threshold for control movements of the ball 2b in this direction. The distance between the two inner surfaces 38, 38' of the channel 36 is such that the path covered by the ball 2b after leaving its neutral position, is limited sufficiently to insure that its center of gravity S' remains within the boundaries of the edge zones 17b, 17b'.

At one of its ends, the control lever 3b comprises a heavier portion 27b with a bore 39. To assemble the lever 3b with the bearing piece, the pin 16b is pushed through the two holes 15b, 15b' in the side walls 14b, 14b', and through the bore 39 in the end portion of the control lever 3b, so that the latter can be swivelled without play between the side walls 14b, 14b'. The control lever 3' resting on the ball 2b, makes contact with the latter through a hollow portion 19b which widens in the direction towards the ball 2b; this hollow part 19b which rests on the ball 2b is composed of two inclined side walls 40, 40' which embrace an angle between them and extend in the longitudinal direction of the control lever 3b in a downward direction, the two side walls extending beyond the outer edges of the control lever 3b. The ridge 41 formed by the two inclined side walls 40, 40', coincides with the axis of symmetry of the control lever 3b. The bottom of this hollow body 19b is provided with a concave channel 42 which is symmetrical in relation to the longitudinal median axis of the control lever 3b and extends parallel to the side walls 40, 40'; its width is smaller than the diameter D of the ball 2b. When assembled, the two side walls 40, 40' and the channel 42 extend transverse to the direction of travel. The control lever 3b, resting on the ball 2b, makes contact with the ball through the limiting edges 43, 43' of the channel 42. So as to ensure that the load applied on the ball 2b by the control lever 3b is very small, the center of gravity S of the lever is arranged near the pin 16b. The ball 2b is stabilized in the direction transverse to the direction of travel by the limiting edges 17b, 17b' of the groove 37, and is stabilized in the direction of travel by the limiting edges 43, 43' of the channel 42. This means that the ball 2b is held in position in a knife-edge manner, which guarantee a very high sensitivity. In addition to this, the above described support enables the tolerances of installation to be fully compensated both in the longitudinal and in the transverse directions.

When the vehicle is loaded by a retarding or accelerating force which exceeds the permissible value, the ball 2b is caused to move in the channel 36 in the longitudinal direction of the vehicle. Since the channel 36 extends in the direction of travel, the ball 2b is not required to carry out any work of lift-up, and the minimum operating value set in this direction can be correspondingly small. The control lever 3b has a very small weight, it being made, say, of a plastics material with a very small specific weight, and it is swivelled upwards as soon as the ball has covered a very short path, the lever motion being promoted by the inclination of the side walls 40, 40' of the hollow body 19b which can be very steep. As in the embodiments described above, in order to avoid the effect of additional moments, the center of gravity S of the control lever 3b, the pin 16b, and the limiting edges 43, 43' of the channel 42 are located in a common plane which is parallel with the limiting edges 17b, 17b' of the groove 37. When the vehicle is affected by a force of deceleration or acceleration in a direction transverse to the direction of travel which exceeds the limiting value of deceleration or acceleration, the ball 2b leaves its position of rest, rolls over the edges 17b or 17b', and thereby causes the control lever 3b to swivel upwards over the inclined side walls 40, 40', while the ball 2b moves on, rolling along the groove 42.

With the control lever 3b swivelled up, the end of the lever 3b which is remote from the pin 16b and has the shape of a pawl, engages with the toothed rim of a coupling disc 44, this connection being retained so that on further withdrawal of the safety belt relative displacement occurs between the rotating coupling disc 44 and the spool shaft 32, which initiates locking of the shaft.

The ball 2b does not leave the horizontal plane of its neutral position when controlling a force of deceleration or acceleration which acts in the direction of travel. It is therefore necessary for external forces to be applied in order to cause the ball to return into its neutral position. Since the spool shaft 32 is loaded by a spiral shaped return spring which causes the belt to be rewound as soon as the belt load is relieved, the toothed backs 44' of the circumferential toothing of the coupling disc 44 press automatically against the backs 3b' of the pawls of the control lever 3b, which means that a component is effective in the direction of the neutral ball position, which causes the ball to return to the neutral position.

When a force of deceleration or acceleration acts transversely to the direction of travel, the ball 2b returns automatically to its neutral position when the control process is completed, because the center of gravity S' of the ball 2b remains within the boundary line of the limiting edges 17b and 17b' of the groove 37.

The control achieved with this embodiment of the invention is highly sensitive. The minimum response value can be set at a very small level, especially in the direction of travel, because the ball 2b does not have to perform any work of lifting when controlling in this direction.

In the embodiment according to FIGS. 9 and 10, a spherical cap bearing 45 is fixed to the casing side wall 6 by means of bolts 46. The upper surface 47 of the spherical cap bearing is concave. The supporting piece 1c is designed in such a manner that its lower edge 48 and the upper edge 45a of the spherical cap bearing are located on the same circular arc. The underside 49 of the supporting piece 1c is convex, the radius of curvature R' being equal to the radius of the upper surface 47 of the spherical cap bearing 45. The upper side 50 of the supporting piece 1c includes a circular recess 51 the plane bottom 52 of which is at a lower level compared with the upper side 50 of the supporting piece 1c. The height of a circular wall 9c which surrounds the recess 51 corresponds advantageously to half the ball diameter. The bottom 52 of the recess 51 includes a circular cut-out 8c the radius of which is smaller than the radius of the ball. The inner diameter of the circular wall 9c is somewhat smaller than the sum of the ball diameter plus the cut-out diameter. The ball 2c rests on the limiting edge 17c of the cut-out 8c and only a segment 18c of the ball extends into the cut-out 8c. The control lever 3c rests on the ball 2c, contact being made through a conical hollow body 19c. The lever 3c is pivoted on a pin 16c between side walls 14c, 14c' of the supporting piece 1c. As above, the pin 16c, the center of gravity S of the control lever 3c, which is located in the vicinity of the pin 16c, between the latter and the points 28c, 28c' on the conical surface of the hollow body 19c where the latter touches the ball, and these contact points 28c, 28c' themselves, are located in a plane which is parallel with the limiting edge zone 17c.

The center of curvature M of the spherical cap bearing 45 is located approximately at the extreme tip 53 of the control lever 3c. With this arrangement it is possible to use a system of standard design with all practical applications, the necessary adjustments being made during installation. The advantages of this arrangement for production are considerable because the number of tools and equipment which have to be made available, are relatively small. The unit consisting of the supporting piece 1c, the ball 2c, and the control lever 3c is placed in its optimum position on the spherical cap bearing and the necessary adjustments are made, before the unit is advantageously glued, or welded, to the bearing 45.

Control devices according to the invention are extremely simply designed, their response sensitivity is very high, and they therefore offer a high degree of dependability. When using a device according to the invention for the control of an automatic retracting device for safety belts, the spool shaft will be locked speedily and reliably in an emergency.

Apart from the functions described above, inertial ball devices according to the invention could be directly or indirectly employed in other situations, for example in cases where problems arising from the switching of electrical impulses have to be solved for actuating an electric switch X.

It is, of course, to be understood that the present invention is, by no means, limited to the specific showing in the drawings, but also comprises any modifications within the scope of the appended claims.

What is claimed is:

1. An inertia operated control device, especially for use in a vehicle for effecting locking of a vehicle safety belt when the vehicle acceleration exceeds a predetermined limit, said device comprising in combination: an inertia element in the form of a ball movable toward several sides from stable rest positioning thereof, a control element pivotally supported at a point spaced generally horizontally from said ball and extending over said ball and having a region resting on top of said ball, a member on which the ball rests and having a recess including an opening with limiting edges forming a response threshold for the ball and located approximately in one plane relative to which the ball is disposed which distance between opposite limiting edges of the opening is less than the radius of the ball, and wherein the maximum lift height of the ball corresponds to the depth of engagement of the ball in the recess, means limiting the movement of the ball on said member so the center of gravity of the ball is located always within the limiting edges, and means operated by upward tilting of said control element as brought about by movement of the ball on said member toward limiting edges of said recess for accurate and highly sensitive initiating of a locking control function as to a safety belt.

2. A control device in combination according to claim 1 in which said region of said control element is concave downwardly.

3. A control device in combination according to claim 1 in which the center of gravity of said control element is located between the point of pivotal support thereof and the said region thereof.

4. A control device in combination according to claim 1 in which the weight of said control element is small and the control element rests on said ball with only a small force.

5. A control device in combination according to claim 1 in which the pivot axis of said control element and the center of gravity thereof and the point of contact thereof with said ball are substantially in a plane parallel to the plane of the edges of the said recess in said member on which the ball rests when in neutral position.

6. A control device in combination according to claim 1 in which said control element is formed of a material which has a specific weight of from about 0.9 to about 2.7 grams per cubic centimeter.

7. A control device in combination according to claim 1 in which said member on which the ball is supported comprises an upwardly opening channel extending in one of the longitudinal and transverse directions of the vehicle and said region of said control element comprises a downwardly opening concavity extending in the other of said directions.

8. A control device in combination according to claim 7 in which said channel has a central longitudinal groove forming the opening in the bottom wall which has a width less than the diameter of said ball.

9. A control device in combination according to claim 7 in which said channel is rectilinear in cross section.

10. A control device in combination according to claim 1 in which said region of said control element which rests on top of said ball is concave downwardly and has wall regions which engage points on the ball spaced from the vertical central axis of the ball.

11. A control device in combination according to claim 1 in which said control element is a single arm lever.

12. A control device in combination according to claim 1 in which the pivotal support for said control element comprises a knife edge support.

13. A control device in combination according to claim 1 in which said means operated by upward tilting includes a locking element for a safety belt adjacent said control element and having teeth engageable by the control element when the control element is tilted by said ball.

14. A control device in combination according to claim 1 in which said member includes means limiting ball movement by forming limiting surfaces to limit movement of the ball on the member so the center of gravity of the ball remains within the range of the limiting edges of the said recess.

15. A control device in combination according to claim 14 in which said surfaces comprises wall means upstanding from said member to a height of about half the ball diameter and spaced horizontally from one another a distance slightly smaller than the sum of the ball diameter and the diameter of the said recess.

16. A control device in combination according to claim 1 which includes means on said member having a convex surface and forming the pivotal support for the control element, and a support cap concave toward said ball for adjustably supporting said member from below.

17. A control device in combination according to claim 16 in which said cap has a support surface engaging said member which is substantially concentric with the free end of said control element.

18. A control device in combination according to claim 16 in which said cap includes means for being fixedly connected to the vehicle and said member includes means for being fixedly connected to said cap in adjusted positions thereon.

19. A control device in combination according to claim 1 further including a switch and in which said ball when moved away from the neutral position thereof effects actuation of said electric switch.

* * * * *